US008661486B2

(12) United States Patent
Ou et al.

(10) Patent No.: US 8,661,486 B2
(45) Date of Patent: Feb. 25, 2014

(54) SYSTEM AND METHOD OF DELIVERING VIDEO CONTENT (75) Inventors: Canhui Ou, Danville, CA (US); Raghvendra Savoor, Walnut Creek, CA (US); Stephen A. Sposato, Lafayette, CA (US); Russell B. Bellford, New Berlin, WI (US); Mung Chiang, Princeton, NJ (US); Zhi Li, Martinez, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1197 days.

(21) Appl. No.: 11/959,812

(22) Filed: Dec. 19, 2007

(65) Prior Publication Data

US 2009/0165043 A1 Jun. 25, 2009

(51) Int. Cl.
*H04N 7/173* (2011.01)

(52) U.S. Cl.
USPC ............... 725/105; 725/38; 725/58; 725/95; 709/225; 709/226; 707/1; 370/432

(58) Field of Classification Search
USPC .......................................... 725/90–91, 94–95
See application file for complete search history.

(56) References Cited

U.S. PATENT DOCUMENTS

| 7,080,400 | B1 * | 7/2006 | Navar | 725/139 |
| 2004/0044745 | A1 * | 3/2004 | Shimizu et al. | 709/217 |
| 2004/0103437 | A1 * | 5/2004 | Allegrezza et al. | 725/95 |
| 2005/0081244 | A1 * | 4/2005 | Barrett et al. | 725/97 |
| 2005/0149975 | A1 * | 7/2005 | Jutzi | 725/95 |
| 2005/0195774 | A1 * | 9/2005 | Chennikara et al. | 370/338 |
| 2006/0075428 | A1 * | 4/2006 | Farmer et al. | 725/38 |
| 2007/0143808 | A1 | 6/2007 | Agrawal et al. | |
| 2007/0160038 | A1 | 7/2007 | Liu et al. | |
| 2008/0055487 | A1 * | 3/2008 | Chang | 348/726 |

OTHER PUBLICATIONS

Kuo-Hui Liu, System and Method of Delivering Video Content, U.S. Appl. No. 11/810,385, Jun. 4, 2007, (75 pgs).

* cited by examiner

*Primary Examiner* — Vivek Srivastava
*Assistant Examiner* — Anthony Bantamoi
(74) *Attorney, Agent, or Firm* — Toler Law Group, PC (57) ABSTRACT Systems and methods of delivering video content are provided. A method of delivering video content is provided that includes predicting a channel change request at a network device. The predicted channel change request indicates a predicted stream of video content. The method also includes generating a control signal at the network device related to the predicted channel change request and storing the control signal at a data storage device associated with the network device. In an illustrative embodiment, the network device stores the control signal when the network device is associated with a first data capacity. Additionally, the network device sends a video content request to a service provider server when the network device is associated with a second data capacity. The video content request is related to the predicted stream.

25 Claims, 5 Drawing Sheets

SYSTEM AND METHOD OF DELIVERING VIDEO CONTENT

FIELD OF THE DISCLOSURE

The present disclosure is generally related to delivering video content.

BACKGROUND

Television viewing is part of daily life for many people. Certain networks that deliver video content may experience limitations that lead to an undesirable television viewing experience. For example, viewers may experience channel change latency after switching channels, as a result of bandwidth limitations of a network. In addition, large numbers of channel change requests during peak viewing times, may result in a disruption to other services, such as Voice over Internet Protocol (VoIP) services and High-Speed Internet services, due to a lack of available bandwidth in the network. Hence, there is a need for an improved system and method of delivering video content.

DETAILED DESCRIPTION OF THE DRAWINGS

A system to deliver video content is disclosed that includes a data storage device, processing logic, and memory accessible to the processing logic. The memory includes instructions executable by the processing logic to receive data indicating a predicted channel change request. The predicted channel change request indicates a predicted stream of video content. The memory also includes instructions executable by the processing logic to send video content to a first network device when the first network device is associated with a first data capacity, where the video content relates to the predicted stream. In addition, the memory includes instructions executable by the processing logic to send the video content to a second network device when the first network device is associated with a second data capacity. Further, the memory includes instructions executable by the processing logic to store the video content at the data storage device when the first network device is associated with a third data capacity.

In another embodiment, a network device is disclosed that includes a network interface, a data storage device, processing logic, and memory accessible to the processing logic. The memory includes instructions executable by the processing logic to determine a data capacity of the network device. The memory also includes instructions executable by the processing logic to store a control signal associated with a predicted channel change request at the data storage device when the data capacity of the network device is associated with a first data capacity. The predicted channel change request indicates a predicted stream of video content. In addition, the memory includes instructions executable by the processing logic to store video content associated with the predicted stream at the data storage device when the data capacity of the network device is associated with a second data capacity.

In another embodiment, a method of delivering video content is disclosed that includes predicting a channel change request at a service provider server. The predicted channel change request indicates a predicted stream of video content. The method also includes sending a first command to a network device when the network device is associated with a first data capacity. The first command relates to generating and storing a control signal associated with the predicted channel change request. In addition, the method includes sending a second command to the network device when the network device is associated with a second data capacity. The second command relates to generating a request to obtain video content associated with the predicted stream and the second command relates to storing the requested video content.

In another embodiment, a method of delivering video content is disclosed that includes predicting a channel change request at a network device. The predicted channel change request indicates a predicted stream of video content. The method also includes generating a control signal at the network device, where the control signal is related to the predicted channel change request, and storing the control signal at a data storage device associated with the network device.

In another embodiment, a computer-readable medium is disclosed having instructions to cause a processor to execute a method that includes predicting a channel change request at a service provider server, where the predicted channel change request indicates a predicted stream of video content, and sending a first command to a network device when the network device is associated with a first data capacity. The first command relates to generating and storing a control signal associated with the predicted channel change request. A computer-readable medium is also disclosed having instructions to cause a processor to execute a method that includes sending a second command to the network device when the network device is associated with a second data capacity. The second command relates to generating a request related to video content associated with the predicted stream and the second command relates to storing the requested video content.

Figure 1:
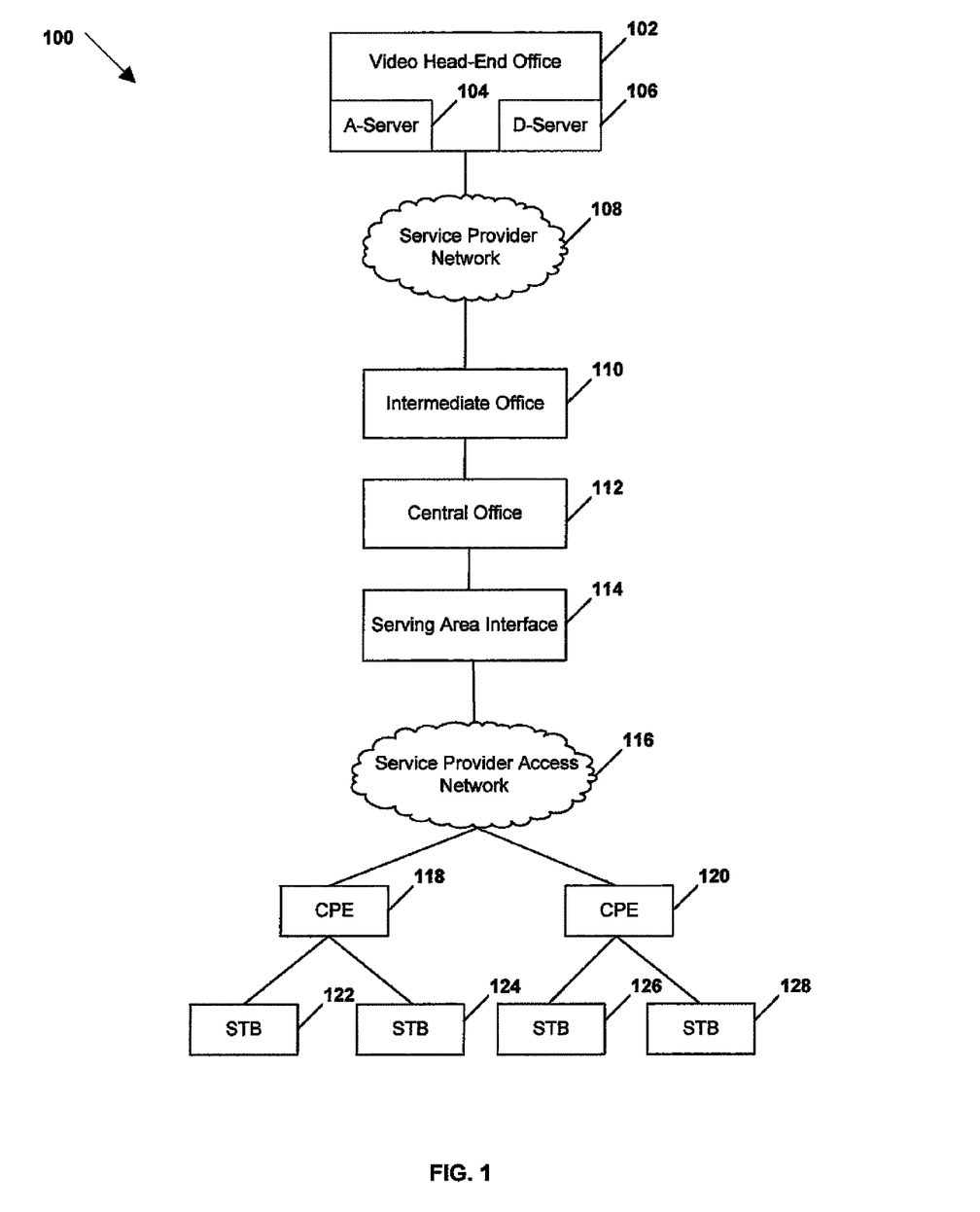
FIG. 1 is a block diagram of a particular embodiment of a system to deliver video content.

FIG. 1 is a block diagram of a particular embodiment of a system 100 to deliver video content. The system 100 includes a video head-end office 102. The video head-end office 102 may include one or more switches, one or more routers, one or more servers, or any combination thereof. For example, the video head-end office 102 may include a multicast based server, such as an acquisition server (A-server) 104. In addition, the video head-end office 102 may include a unicast based server, such as a distribution server (D-server) 106. Further, the video head-end office 102 may include one or more servers (not shown) adapted to manage the storage of control signals and video content related to predicted channel change requests associated with a plurality of set-top box devices 122-128. The video head-end office 102 may function as a national head-end office, a regional head-end office, a local head-end office, or any combination thereof.

The video head-end office 102 may provide communications services to one or more subscriber premises via customer premises devices, such as a first customer premises equipment (CPE) unit 118 and a second CPE unit 120. For example, the video head-end office 102 may provide Internet Protocol Television (IPTV) services to the CPE units 118, 120. The video head-end office 102 may receive or acquire video content, such as television content, movie content, advertisement content, other video content, or any combination thereof, from a satellite acquisition system, a satellite head-end office, one or more video-on-demand (VOD) sources outside the IPTV network, such as movie studios and programmers of non-live content, or any combination thereof, to provide IPTV services to the CPE units 118, 120.

The A-server 104 may be adapted to manage multicast traffic associated with video content received at the video head-end office 102. For example, the A-server 104 may be adapted to send multicast video content related to each stream of video content received at the video head-end office 102 to one or more intermediate offices, such as the intermediate office 110. In an illustrative, non-limiting embodiment, the A-server 104 may be adapted to send one or more copies of multicast video content related to a particular stream to the intermediate office 110 in response to receiving a multicast request associated with the particular stream from the intermediate office 110, in response to a fixed multicast request stored at the A-server 104 and related to the particular stream, or any combination thereof.

The D-server 106 may be adapted to manage unicast traffic associated with the CPE units 118, 120. For example, the D-server 106 may receive instant channel change (ICC) requests related to channel change requests made via the set-top box devices 122-128. In addition, the D-server 106 may be adapted to provide unicast services, such as Voice over Internet Protocol (VoIP) services, high speed internet services, or any combination thereof, to the CPE units 118, 120. Further, the D-server 106 may handle packet loss events related to data sent from the video head-end office 102 to the CPE units 118, 120.

The video head-end office 102 is adapted to communicate with the intermediate office 110 via a service provider network 108, such as a private internet protocol (IP) network. The intermediate office 110 may include one or more switches, one or more routers, and one or more servers. For example, the intermediate office 110 may include a router adapted to receive multicast video content from the A-server 104, a router adapted to receive unicast traffic from the D-server 106, or any combination thereof.

The intermediate office 110 may be adapted to forward a copy of each multicast video content stream received at the intermediate office 110 to the central office 112. In an illustrative, non-limiting embodiment, the intermediate office 110 may be adapted to send a copy of multicast video content related to a particular stream to the central office 112 in response to receiving a multicast request associated with the particular stream from the central office 112, in response to a fixed multicast request stored at the intermediate office 110 and related to the particular stream, or any combination thereof. Further, the intermediate office 110 may be adapted to communicate unicast traffic with the central office 112.

The central office 112 may include one or more switches, one or more routers, and one or more servers. For example, the central office 112 may include a switch that is adapted to receive multicast traffic from the intermediate office 110, unicast traffic from the intermediate office 110, or any combination thereof. The central office 112 may be adapted to send a copy of multicast video content related to a particular stream to a serving area interface 114. The copy of multicast video content sent to the serving area interface 114 may relate to a stream requested by one or more of the set-top box devices 122-128. For example, a stream requested by the one or more set-top box devices 122-128 may relate to a television channel offered by a service provider or a video on-demand (VOD) program. Additionally, the central office 112 may be adapted to communicate unicast traffic with the serving area interface 114 related to one or more services provided by the video head-end office 102.

The serving area interface 114 may include one or more switches, one or more routers, or one or more servers. In an illustrative, non-limiting embodiment, the serving area interface 114 may include a digital subscriber line access multiplexer (DSLAM). The serving area interface 114 may be adapted to provide multicast data and unicast data received from the central office 112 to the CPE units 118, 120.

The serving area interface 114 is adapted to communicate with the CPE units 118, 120 via a service provider access network 116, such as a private IPTV access network. The service provider access network 116 may include a very high data rate digital subscriber line (VDSL) loop. The CPE units 118, 120 may include a router, a local area network device, a modem, such as a digital subscriber line (DSL) modem or a cable modem, a residential gateway, any other suitable device that facilitates communication between the serving area interface 114 and the CPE units 118, 120, or any combination thereof. The first CPE unit 118 is coupled to a set-top box device 122 and a set-top box device 124. In addition, the second CPE unit 120 is coupled to a set-top box device 126 and a set-top box device 128. The CPE units 118, 120 may be adapted to communicate multicast data and unicast data received from the serving area interface 114 to the respective set-top box devices 122-128. Each of the set-top box devices 122-128 may be adapted to provide video content to one or more respective display devices.

In a particular embodiment, components of the system 100 may be adapted to predict channel change requests associated with one or more set-top box devices 122-128 based on viewing pattern data related to the respective set-top box devices 122-128, based on digital video recorder (DVR) video content requests associated with the respective set-top box devices 122-128, or any combination thereof. For example, the set-top box devices 122-128, the CPE units 118, 120, the serving area interface 114, the central office 112, the intermediate office 110, the video head-end office 102, or any combination thereof may be adapted to predict channel change requests associated with the set-top box devices 122-128. The viewing pattern data may include real-time or near real-time data, historical data, or any combination thereof, indicating a time of one or more channel change requests, a day of the one or more channel change requests, a subscriber associated with each of the one or more channel change requests, a category of video content associated with each of the one or more channel change requests, a trend associated with the one or more channel change requests, a channel viewed before each of the one or more channel change requests, a channel viewed after the one or more channel change requests, or any combination thereof.

In an illustrative embodiment, the serving area interface 114 is adapted to receive viewing pattern data and DVR video content request data from each of the set-top box devices 122-128. Based on the viewing pattern data and the DVR video content request data received from one of the set-top box devices 122-128, such as the set-top box device 122, the serving area interface 114 may be adapted to predict a channel change request associated with the set-top box device 122. For example, serving area interface 114 may predict that the set-top box device 122 will switch from receiving a stream associated with ESPN to a stream associated with HBO at 9 p.m. on a particular day.

Additionally, components of the system 100 may be adapted to execute learning theory based algorithms to more efficiently predict channel change requests associated with the set-top box devices 122-128. To illustrate, a component of the system 100, such as the serving area interface 114, may continuously update an algorithm used to predict channel change requests for a particular one of the set-top box devices 122-128, such as the set-top box device 122, based on viewing pattern data and DVR video content request data associated with the set-top box device 122.

Components of the system 100 may also be adapted to store control signals related to predicted channel change requests, to store video content related to predicted channel change requests, or any combination thereof. For example, the set-top box devices 122-128, the CPE units 118, 120, the serving area interface 114, the central office 112, the intermediate office 110, the video head-end office 102, or any combination thereof, may be adapted to store control signals, video content, or any combination thereof, related to predicted channel change requests associated with the set-top box devices 122-128.

The video head-end office 102 may be adapted to analyze data capacity information received from respective components of the system 100 to identify components of the system 100 that are capable of storing video content and control signals associated with a predicted channel change request. The data capacity information may relate to an amount of memory utilized by a memory device of a particular component of the system 100, an amount of data transmitted and received via a network interface of the particular component of the system 100, or any combination thereof. In an illustrative embodiment, the video head-end office 102 may determine that the first CPE unit 118 is capable of storing one or more control signals related to a predicted channel change request associated with the set-top box device 122 and that the serving area interface 114 is capable of storing video content related to the predicted channel change request. In an illustrative, non-limiting embodiment, the video head-end office 102 may be adapted to determine a component of the system 100 that is nearest to the set-top box device 122 that can store a control signal associated with a predicted channel change request, video content associated with the predicted channel change request, or any combination thereof. Additionally, as conditions within the system 100 change, the video head-end office 102 may be adapted to direct components of the system 100 to store control signals and video content associated with predicted channel change requests that were not previously storing control signals, video content, or any combination thereof, related to predicted channel change requests. For example, as data traffic throughout the system 100 decreases, the video head-end office 102 may be adapted to stop directing the central office 112 to store control signals and video content related to predicted channel change requests and to start directing the first CPE unit 118 to store control signals and video content related to predicted channel change requests because the data capacity of the first CPE unit 118 has increased.

After the video head-end office 102 has identified components of the system 100 that are capable of storing a control signal and video content associated with a predicted channel change request, the video head-end office 102 may be adapted to send corresponding commands to the respective components. For example, the video head-end office 102 may send a command to the first CPE unit 118 to generate and store one or more control signals related to a predicted channel change request associated with the set-top box device 122. In another example, the video head-end office 102 may send a command to the serving area interface 114 to store video content related to a predicted channel change request. The serving area interface 114 may be adapted to respond to the command from the video head-end office 102 related to storing video content associated with the predicted channel change request by joining a multicast group associated with the video content, making a copy of the video content when the serving area interface 114 is already included in the multicast group, storing the video content at a data storage device associated with the serving area interface 114, or any combination thereof.

After a channel change request has been predicted for one of the set-top box devices 122-128, such as the set-top box device 122, the set-top box device 122 may receive data indicating a channel change request from an input device, such as a remote control device. The channel change request may relate to a particular stream offered by the video head-end office 102. In a particular embodiment, the set-top box device 122 is adapted to generate a unicast instant channel change (ICC) request related to the requested stream, unless the set-top box device 122 has stored data related to the predicted channel change request. For example, the set-top box device 122 may have stored one or more control signals related to a predicted channel change request. To illustrate, the set-top box device 122 may have stored an Internet Group Management Protocol (IGMP) request to join a multicast group associated with HBO at 9 p.m. on a specified day and an IGMP request to leave a multicast group associated with ESPN at 9 p.m. on the specified day. The set-top box device 122 may be adapted to monitor data related to channel change requests received around 9 p.m. on the specified day to identify a channel change request that corresponds to the predicted channel change request. If the set-top box device 122 receives data indicating a channel change request that matches the predicted channel change request, then the set-top box device 122 may execute the stored control signals. Otherwise, the set-top box device 122 may be adapted to generate an ICC request and forward the ICC request to the first CPE unit 118.

Further, each component of the system 100 receiving an ICC request from the set-top box device 122 may be adapted to determine if the respective component has stored data associated with a predicted channel change request that corresponds to the received ICC request. For example, the serving area interface 114 may have stored control signals, video content, or any combination thereof, related to a predicted channel change request associated with the set-top box device 122 because the data capacity of the set-top box device 122 and the first CPE unit 118 was not sufficient to store the control signals, the video content, or any combination thereof.

The serving area interface 114 may monitor received ICC requests to identify any ICC requests that correspond to the predicted channel change request. If the serving area interface 114 receives an ICC request that matches a predicted channel change request, then the serving area interface 114 may execute any control signals stored at the serving area interface 114 related to the predicted channel change request. The serving area interface 114 may execute the stored control signals by determining if the serving area interface 114 is associated with a multicast group related to the stored control signals. For example, when the serving area interface 114 is associated with a multicast group related to a stored multicast join request, then the serving area interface 114 is adapted to make a copy of video content indicated by the stored multicast join request and forward the video content to the first CPE unit 118. In another example, when the serving area interface 114 is associated with a multicast group related to a stored multicast leave request, then the serving area interface 114 is adapted to remove the set-top box device 122 from the multicast group. When the serving area interface 114 is not associated with a multicast group of the stored control signals, then the serving area interface 114 is adapted to forward a multicast join request, a multicast leave request, or any combination thereof to the central office 112. Further, if the serving area interface 114 has stored video content related to a predicted channel change request that matches a received ICC request, then the serving area interface 114 may be adapted to forward the stored video content to the first CPE unit 118 in addition to executing one or more stored control signals. To illustrate, the serving area interface 114 may store streaming video content related to the predicted channel change request in a buffer, such as a First In First Out (FIFO) buffer, such that real-time video content associated with a predicted stream is available to be sent to the first CPE unit 118 when the predicted channel change request matches the received ICC request.

When the serving area interface 114 identifies that a received ICC request does not match a predicted channel change request, then the serving area interface 114 may be adapted to forward the ICC request to the central office 112. If the central office 112 and the intermediate office 110 have not stored any data related to a predicted channel change request that matches the ICC request, then the ICC request is forwarded to the D-server 106. The D-server 106 may be adapted to respond to the ICC request by sending a unicast stream associated with video content related to the ICC request to the set-top box device 122. The D-server 106 may provide the unicast stream to the set-top box device 122 until the set-top box device 122 receives multicast video content associated with the stream indicated by the channel change request.

Figure 2:
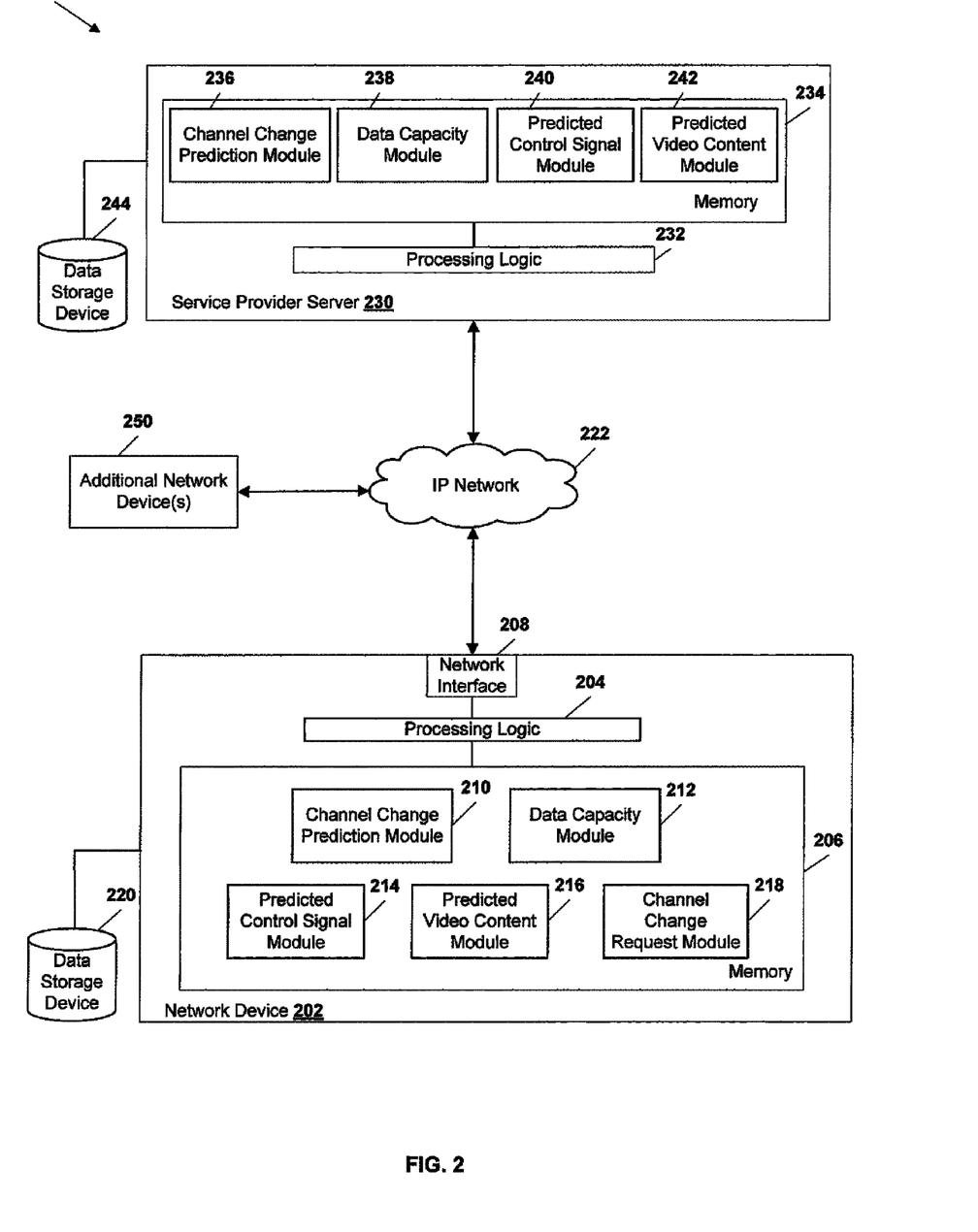
FIG. 2 is a block diagram of a second particular embodiment of a system to deliver video content.

FIG. 2 is a block diagram of a second particular embodiment of a system 200 to deliver video content. The system 200 includes a network device 202 that communicates video content with a service provider server 230, one or more additional network devices 250, or any combination thereof, via an Internet Protocol (IP) network 222. The IP network 222 may include a public IP network, a private IP network, such as a private IP network of a service provider, a private access network of an IPTV network, or any combination thereof. The network device 202 includes processing logic 204 and memory 206 accessible to the processing logic 204. In addition, the network device 202 includes a network interface 208 to communicate with the IP network 222. Further, the network device 202 is associated with a data storage device 220. The data storage device 220 may be coupled to or integrated with the network device 202. The network device 202 may include a set-top box device, customer premises equipment, a digital subscriber line access multiplexer (DSLAM), a switch, a router, a server, or any combination thereof.

In a particular embodiment, the memory 206 includes a channel change prediction module 210 that is executable by the processing logic 204 to predict a channel change request. The predicted channel change request may be related to a predicted stream of video content. The channel change prediction module 210 may be executable by the processing logic 204 to predict a channel change request based on viewing pattern data associated with a particular set-top box device, viewing pattern data associated with a particular subscriber, digital video recorder (DVR) video content request data, or any combination thereof. The viewing pattern data may be collected by the network device 202 or the viewing pattern data may be received at the network device 202 from the one or more additional network devices 250, from the service provider server 230, or any combination thereof. The channel change prediction module 210 may also be executable by the processing logic 204 to send viewing pattern data to the service provider server 230, the one or more additional network devices 250, or any combination thereof.

Additionally, the channel change prediction module 210 may be executable by the processing logic 204 to execute a learning theory based algorithm to predict a channel change request. The channel change prediction module 210 may be executable by the processing logic 204 to continuously update the learning theory based algorithm based on viewing pattern data, DVR video content request data, or any combination thereof.

The memory 206 also includes a data capacity module 212 that is executable by the processing logic 204 to determine a data capacity of the network device 202. In an illustrative embodiment, the data capacity module 212 is executable by the processing logic 204 to collect information related to the data capacity of the network device 202. For example, the data capacity information may relate to real-time or near real-time information, historical information, or any combination thereof, indicating an amount of memory utilized by a memory device of the network device 202, an amount of data handled via the network interface 208, or any combination thereof. The data capacity information may be stored at the data storage device 220. Additionally, the data capacity module 212 may be executable by the processing logic 204 to send data capacity information to the service provider server 230, to one or more of the additional network devices 250, or any combination thereof.

Based on the data capacity information collected at the network device 202, the data capacity module 212 may be executable by the processing logic 204 to determine a data capacity of the network device 202. The data capacity of the network device 202 may be related to an amount of additional data that can be stored, processed, or any combination thereof, by the network device 202. For example, the data capacity of the network device 202 may indicate that a memory device, such as a random access memory device or the data storage device 220, can store an additional 1.5 gigabytes of data out of a total of 5 gigabytes. In another example, the data capacity of the network device 202 may indicate that the network interface 208 can handle 2 gigabits of additional data out of a total of 10 gigabits. In an illustrative, non-limiting embodiment, the data capacity module 212 may be executable by the processing logic 204 to determine an amount of video content, control signals, or any combination thereof, related to predicted channel change requests that can be stored at the data storage device 220, that can be received at the network interface 208, or any combination thereof. The data capacity module 212 may be executable by the processing logic 204 to send data to the service provider server 230, to one or more of the additional network devices 250, or any combination thereof, indicating the data capacity of the network device 202.

The data capacity module 212 may also be executable by the processing logic 204 to determine if the data capacity of the network device 202 is within a particular range, is above or below a specified threshold, or any combination thereof. For example, a service provider may establish guidelines indicating that the network device 202 can store control signals, video content, or any combination thereof, related to a predicted channel change request when the data capacity of the network device 202 is within a particular range or above or below a particular threshold.

The data capacity module 212 may be executable by the processing logic 204 to receive information related to a data capacity of one or more of the additional network devices 250 from the service provider server 230, from one or more of the additional network devices 250, or any combination thereof. The data capacity module 212 may be executable by the processing logic 204 to determine a data capacity of one or more of the additional network devices 250 based on data capacity information received at the network device 202.

In a particular embodiment, the memory 206 includes a predicted control signal module 214 that is executable by the processing logic 204 to manage control signals associated with predicted channel change requests. In an illustrative embodiment, the predicted control signal module 214 may be executable by the processing logic 204 to generate one or more control signals associated with a predicted channel change request. The one or more control signals may be a multicast join request, such as an Internet Group Management Protocol (IGMP) join request, related to the predicted stream, a multicast leave request related to the predicted stream, or any combination thereof. In an illustrative, non-limiting embodiment, the predicted control signal module 214 may be executable by the processing logic 204 to generate and store a control signal associated with a predicted channel change request when the network device 202 is associated with a particular data capacity, such as a first amount of memory available at a memory device of the network device 202.

In a particular embodiment, the memory 206 includes a predicted video content module 216 that is executable by the processing logic 204 to manage video content associated with a predicted channel change request. In an illustrative embodiment, the predicted video content module 216 may be executable by the processing logic 204 to manage video content associated with a predicted channel change request when the network device 202 is associated with a data capacity that is higher than the data capacity required to generate and store control signals related to predicted channel change requests. For example, service provider guidelines may specify that when the network interface 208 can handle more than 2 gigabits of additional data and when the data storage device 220 can store more than 3 gigabytes of data, then the network device 202 may be adapted to store video content associated with a predicted channel change request, but when the data capacity is lower, then the network device 202 may only be adapted to generate and store control signals related to predicted channel change requests. In an illustrative, non-limiting embodiment, the network device 202 may be adapted to store video content related to a predicted channel change request based on an amount of data associated with the predicted video content stream. For example, service provider guidelines may set a data capacity threshold or range higher for video content streams associated with more data.

After determining that the network device 202 is associated with a data capacity related to storing video content associated with predicted channel change requests, the predicted video content module 216 may be executable by the processing logic 204 to determine when the network device 202 is included in a multicast group related to a predicted stream of video content. When the network device 202 is included in the multicast group of the predicted stream of video content, the predicted video content module 216 may be executable by the processing logic 204 to make a copy of the predicted stream and store the copy of the predicted stream at the data storage device 220. Further, when the network device 202 is not included in the multicast group of the predicted stream, the predicted video content module 216 may be executable by the processing logic 204 to send a multicast join request related to the predicted stream of video content to the service provider server 230, to one or more of the additional network devices 250, or any combination thereof. After receiving the requested video content, the predicted video content module 216 may be executable by the processing logic 204 to store the received video content related to the predicted stream at the data storage device 220. For example, the predicted video content module 216 may be executable by the processing logic 204 to buffer video content associated with the predicted stream in real-time at the data storage device 220. Further, the predicted video content module 216 may be executable by the processing logic 204 to store a particular segment of video content associated with the predicted stream at the data storage device 220.

Additionally, the predicted video content module 216 may be executable by the processing logic 204 to send video content to one or more of the additional network devices 250 in response to receiving data capacity information indicating that the one or more additional network devices 250 are associated with a data capacity required to store video content related to predicted channel change requests. For example, the predicted video content module 216 may be executable by the processing logic 204 to make a copy of video content received at the network device 202 that is related to a predicted channel change request and forward the copy of video content to the one or more additional network devices 250 associated with the specified data capacity.

In a particular embodiment, the memory 206 includes a channel change request module 218 that is executable by the processing logic 204 to manage data indicating a channel change request received at the network device 202. The channel change request may indicate a stream of video content offered by a service provider. In an illustrative embodiment, the channel change request module 218 may be executable by the processing logic 204 to receive channel change request data from a remote control device, such as a remote control device associated with a particular set-top box device. The channel change request module 218 may be executable by the processing logic 204 to determine if a channel change request received at the network device 202 matches a predicted channel change request.

In an illustrative, non-limiting embodiment, the channel change request module 218 may be executable by the processing logic 204 to determine if the channel change request matches a predicted channel change request by monitoring channel change request data received at the network device 202 around a time associated with a predicted channel change request, by monitoring all channel change request data until a period of time associated with the predicted channel change request expires, or any combination thereof. For example, the channel change request module 218 may be executable by the processing logic 204 to monitor for a channel change request that is predicted to occur at 9 p.m. on a specified day between 8:58 p.m. and 9:02 p.m. on the specified day. The channel change request module 218 may also be executable by the processing logic 204 to delete control signals, video content, or any combination thereof, stored at the data storage device 220 if the network device 202 does not receive data indicating a channel change request that matches the predicted channel change request within a certain period of time, such as within 2 minutes of a time indicated by the predicted channel change request.

When data indicating a channel change request does not match data indicating a predicted channel change request, the channel change request module 218 may be executable by the processing logic 204 to generate a unicast instant channel change (ICC) request and forward the ICC request to one or more of the additional network devices 240, to the service provider server 230, or any combination thereof. The unicast ICC request generated by the channel change request module 218 may indicate a particular stream of video content offered by a service provider. When data indicating a channel change request matches data indicating a predicted channel change request, the channel change request module 218 may be executable by the processing logic 204 to determine if any data associated with the predicted channel change request is stored at the network device 202. When control signals associated with the predicted channel change request are stored at the network device 202, the channel change request module 218 may be executable by the processing logic 204 to execute the stored control signals. For example, the channel change request module 218 may be executable by the processing logic 204 to forward a stored multicast join request, a stored multicast leave request, or any combination thereof, to one or more of the additional network devices 250, to the service provider server 230, or any combination thereof. In addition, when video content associated with a predicted channel change request that matches received channel change request data is stored at the network device 202, the channel change request module 218 may be executable by the processing logic 204 to provide the stored video content to a display device associated with the network device 202.

In another illustrative embodiment, the channel change request module 218 may be executable by the processing logic 204 to receive an ICC request from one or more of the additional network devices 250. After receiving the ICC request, the channel change request module 218 may be executable by the processing logic 204 to determine if the network device 202 includes data associated with a predicted channel change request that matches the ICC request. When the network device 202 does not include data associated with a predicted channel change request that matches the ICC request, then the channel change request module 218 may be executable by the processing logic 204 to forward the ICC request to one or more of the additional network devices 250, to the service provider server 230, or any combination thereof.

However, when the network device 202 has stored control signals associated with a matching predicted channel change request, then the channel change request module 218 may be executable by the processing logic 204 to execute the stored control signals. For example, the channel change request module 218 may be executable by the processing logic 204 to determine when the network device 202 is associated with a multicast group related to a stored multicast join request. When the network device 202 is associated with the multicast group related to the stored multicast join request, then the channel change request module 216 may be executable by the processing logic 204 to make a copy of video content indicated by the stored multicast join request and forward the copy of video content to the one or more of the additional network devices 250 that sent the ICC request. When the network device 202 is not a part of a multicast group associated with a stored multicast join request, then the channel change request module 218 may be executable by the processing logic 204 to forward the stored multicast join request to one or more of the additional network devices 250, to the service provider server 230, or any combination thereof.

Further, when a predicted channel change request matches a received ICC request, the channel change request module 218 may be executable by the processing logic 218 to send video content associated with the predicted stream that is stored at the data storage device 220 to the one or more additional network devices 250 that sent the ICC request. In an illustrative, non-limiting embodiment, the channel change request module 218 may be executable by the processing logic 204 to send video content associated with a predicted stream that is being buffered at the data storage device 220 to the one or more additional network devices 250 that sent the ICC request until the one or more additional network devices 250 have been added to a multicast group associated with the predicted stream. The channel change request module 218 may also be executable by the processing logic 204 to send a particular segment of video content associated with the predicted stream that is stored at the data storage device 220 to the one or more additional network devices 250 that sent the ICC request. The length of the particular segment of video content may relate to an amount of time estimated to add the one or more additional network devices 250 to a multicast group associated with the predicted stream.

The service provider server 230 includes processing logic 232 and memory 234 that is accessible to the processing logic 232. The service provider server 230 is associated with a data storage device 244. The data storage device 244 may be integrated with or coupled to the service provider server 230. The service provider server 230 communicates with the network device 202, the one or more additional network devices 250, or any combination thereof, via the IP network 222. The service provider server 230 may be included in a video head-end office of a service provider.

The memory 234 includes a channel change prediction module 236 that is executable by the processing logic 232 to predict a channel change request. The predicted channel change request may indicate a predicted stream of video content offered by a service provider. The channel change prediction module 236 may be executable by the processing logic 232 to predict the channel change request based on data received from the network device 202, one or more of the additional network devices 250, or any combination thereof. The channel change prediction module 236 may be executable by the processing logic 232 to predict a channel change request based on viewing pattern data, digital video recorder (DVR) video content request or any combination thereof, received from the network device 202, one or more of the additional network devices 250, or any combination thereof.

In an illustrative, non-limiting embodiment, the channel change prediction module 236 may be executable by the processing logic 232 to send viewing pattern data, DVR video content request data, or any combination thereof, received at the service provider server 230 to the network device 202, to one or more of the additional network devices 250, or any combination thereof. Further, the channel change prediction module 236 may be executable by the processing logic 232 to receive the data indicating a predicted channel change request from the network device 202, one or more of the additional network devices 250, or any combination thereof.

The memory 234 includes a data capacity module 238 that is executable by the processing logic 232 to determine a data capacity associated with the network device 202, one or more of the additional network devices 250, or any combination thereof. In an illustrative embodiment, the data capacity module 238 is executable by the processing logic 232 to determine the data capacity of the network device 202 based on data capacity information received from the network device 202. For example, the data capacity information may indicate an amount of memory utilized by a memory device of the network device 202, an amount of data being handled by the network interface 208, or any combination thereof. The data capacity module 238 may also be executable by the processing logic 232 to send data indicating a data capacity associated with the network device 202, one or more of the additional network device 250, or any combination thereof to the network device 202, to one or more of the additional network device 250, or any combination thereof.

In a particular embodiment, the memory 234 includes a predicted control signal module 240 that is executable by the processing logic 232 to manage control signals associated with predicted channel change requests. In an illustrative embodiment, the predicted control signal module 240 is executable by the processing logic 232 to generate and send control signals related to a predicted channel change request to the network device 202 based on the data capacity of the network device 202. In another illustrative embodiment, the predicted control signal module 240 is executable by the processing logic 232 to send a command to the network device 202 to generate and store one or more control signals associated with a predicted channel change request based on the data capacity of the network device 202.

In a particular embodiment, the memory 234 includes a predicted video content module 242 that is executable by the processing logic 232 to manage video content related to predicted channel change requests. In an illustrative embodiment, the predicted video content module 242 is executable by the processing logic 232 to make a copy of video content received at the service provider server 230 that is related to a predicted channel change request and send the copy of the video content to the network device 202 based on the data capacity of the network device 202. In another illustrative embodiment, the predicted video content module 242 is executable by the processing logic 232 to send a command to the network device 202 based on the data capacity of the network device 202 to obtain a copy of video content associated with a predicted channel change request and to store the copy. The command sent to the network device 202 may also be related to making a copy of video content associated with the predicted channel change request when the network device 202 is already included in a multicast group associated with the predicted stream of video content.

The predicted video content module 242 may also be executable by the processing logic 232 to generate a copy of video content received at the service provider server 232 that is related to a predicted channel change request and store the copy of the video content at the data storage device 244 when the data capacity of the network device 202, the data capacity of the one or more additional network devices 250, or any combination thereof, is not above a specified data capacity. Additionally, the predicted video content module 242 may be executable by the processing logic 232 to identify ICC requests, multicast join requests, or any combination thereof, received at the service provider server 230 that match a predicted channel change request and send stored video content associated with the matching predicted channel change request to the network device 202, to one or more of the additional network devices 250, or any combination thereof.

For ease of explanation, the various modules 210-218 and 236-242 have been described in terms of processor-executable instructions. However, those skilled in the art will appreciate that such modules can be implemented as hardware logic, processor-executable instructions, or any combination thereof.

Figure 3:
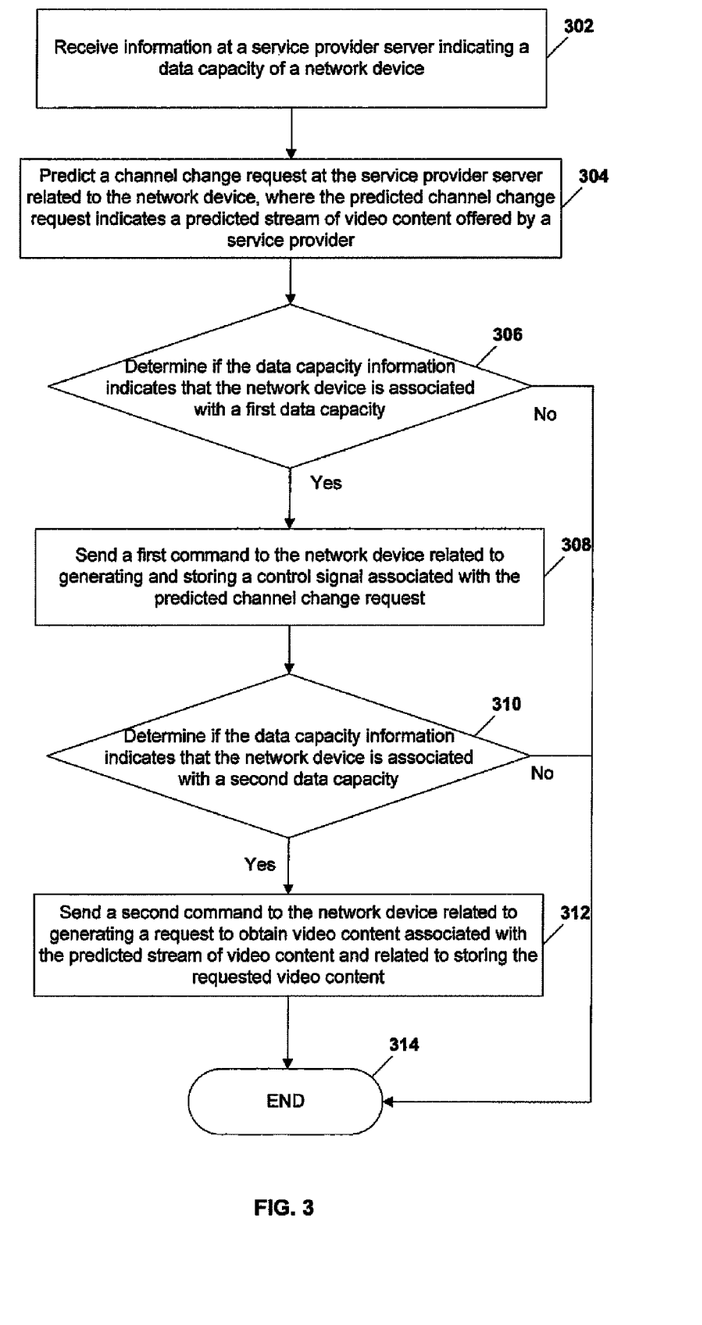
FIG. 3 is flow diagram a particular embodiment of a method of delivering video content.

FIG. 3 is a flow diagram of a particular embodiment of a method of delivering video content. At block 302, a service provider server receives information indicating a data capacity of a network device. Moving to block 304, the service provider server predicts a channel change request related to the network device. The predicted channel change request indicates a predicted stream of video content offered by a service provider. Proceeding to decision block 306, the service provider server determines if the data capacity information indicates that the network device is associated with a first data capacity. If the network device is associated with the first data capacity, then the method proceeds to block 308. At block 308, the service provider server sends a first command to the network device related to generating and storing a control signal associated with the predicted channel change request. The control signal may be an IGMP join request, an IGMP leave request, or any combination thereof. If the service provider server determines that the network device is not associated with the first data capacity, the method terminates at 314.

At decision block 310, the service provider server determines if the data capacity information indicates that the network device is associated with a second data capacity. If the network device is associated with the second data capacity, the method proceeds to block 310. At block 310, the service provider server sends a second command to the network device related to generating a request to obtain video content associated with the predicted stream of video content and related to storing the requested video content. If the service provider server determines that the network device is not associated with the specified data capacity, the method terminates at 314.

Figure 4:
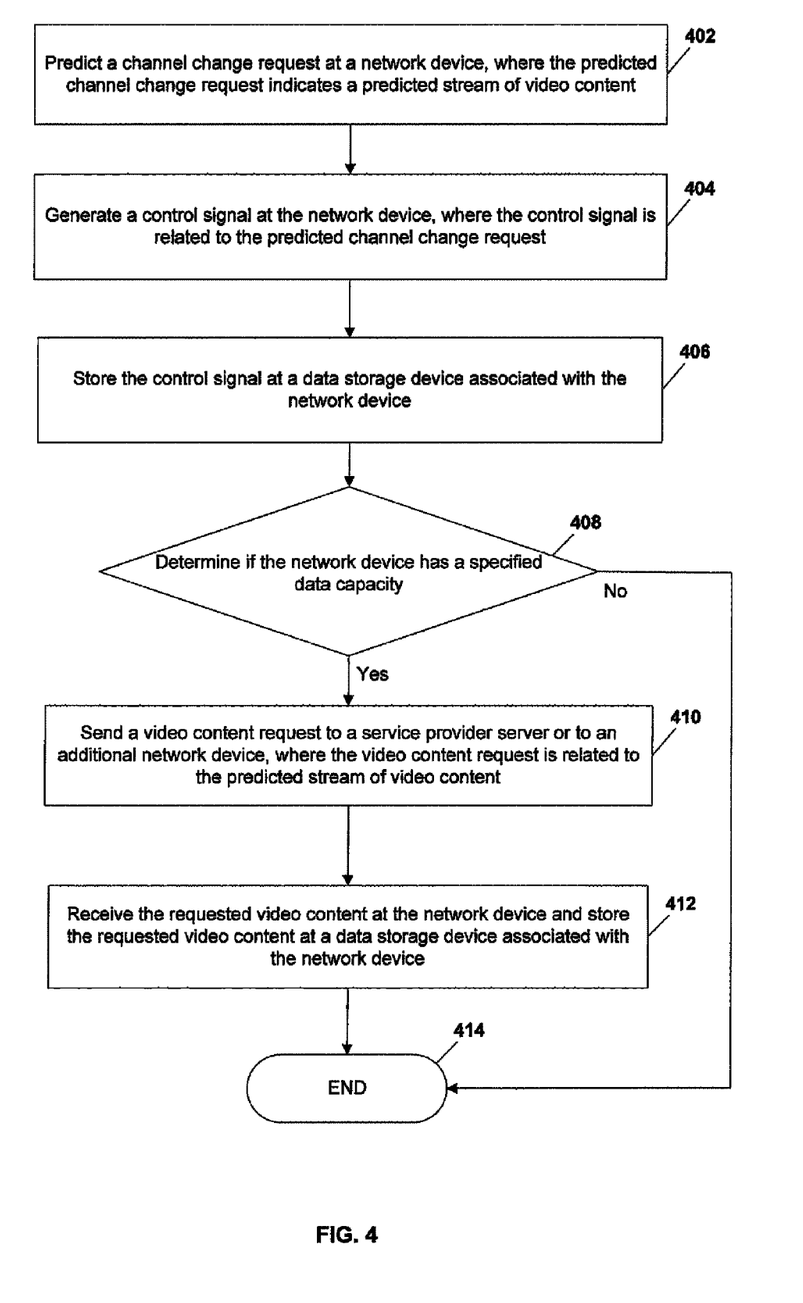
FIG. 4 is a flow diagram of a second particular embodiment of a method of delivering video content.

FIG. 4 is a flow diagram of a second particular embodiment of a method of delivering video content. At block 402, a network device predicts a channel change request. The predicted channel change request indicates a predicted stream of video content. Moving to block 404, the network device generates a control signal. The control signal is related to the predicted channel change request. Proceeding to block 406, the network device stores the control signal at a data storage device associated with the network device.

At decision block 408, the network device determines if the data capacity of the network device is a specified data capacity. If the network device determines that the data capacity of the network device is not a specified data capacity, the method terminates at 414. If the network device determines that the data capacity of the network device is the specified data capacity, the method proceeds to block 410. At block 410, the network device sends a video content request to a service provider server or to an additional network device, where the video content request is related to the predicted stream of video content. For example, a customer premises equipment unit may send a video content request to a central office of a service provider network related to the predicted stream of video content. Proceeding to block 412, the network device receives the requested video content and stores the requested video content at the data storage device. The method terminates at 414.

According to particular embodiments, video content may be delivered to a subscriber premises with minimal effect on the performance of a service provider network. Channel change requests related to each subscriber premises may be predicted and data associated with the predicted channel change requests, such as control signals and video content, may be stored at network devices that are as close as possible to the subscriber premises. The storing of control signals and video content as close as possible to the subscriber premises reduces the amount of traffic throughout the services provider network when the predicted channel change requests match actual channel change requests. In addition, as conditions within the services provider network change, such as decreased or increased network traffic, the data associated with a predicted channel change request may be efficiently stored throughout the services provider network depending on the data capacity of each network device.

Figure 5:
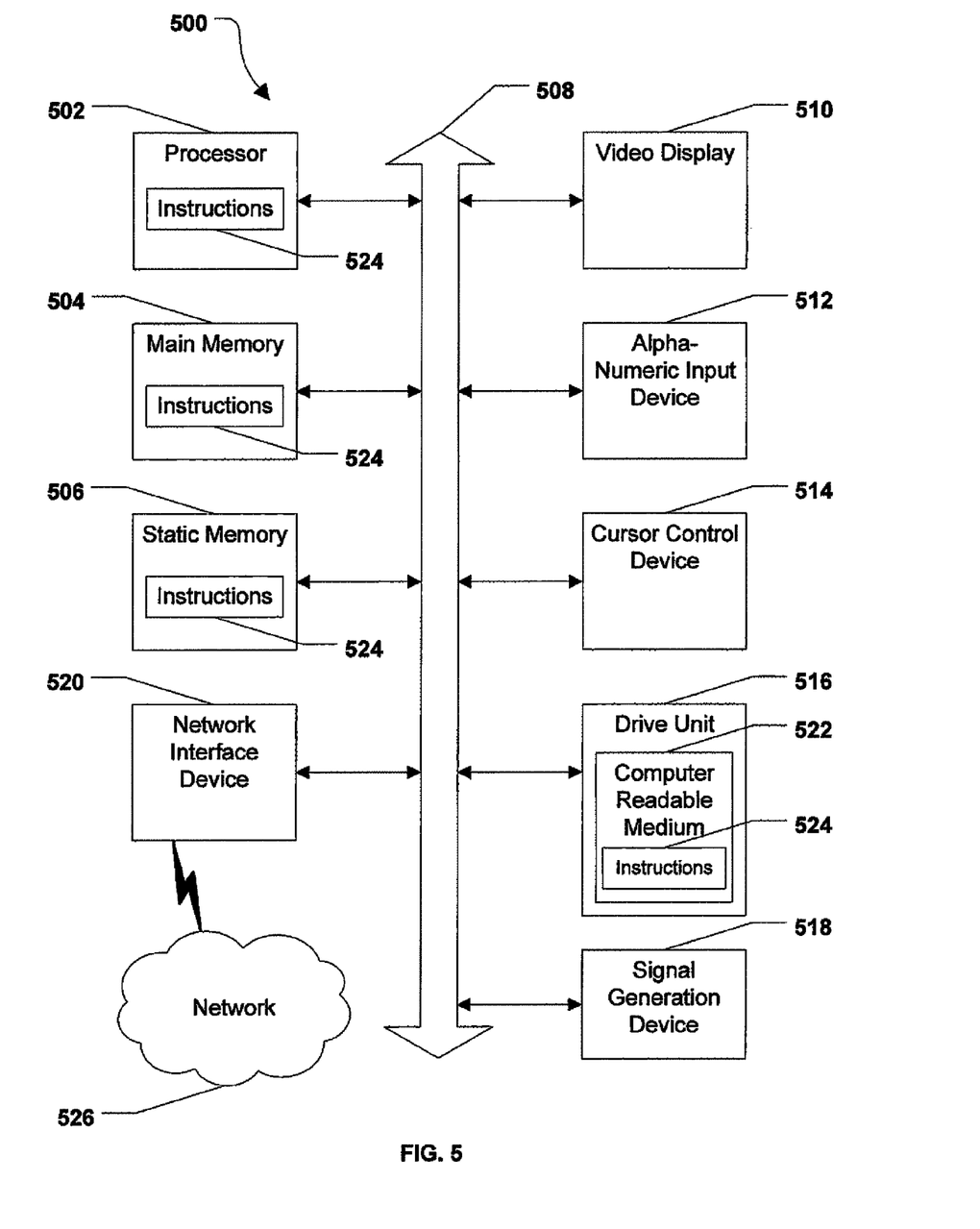
FIG. 5 is a block diagram of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices, including a server, a set-top box device, a router, a switch, or a customer premises equipment unit, as shown in FIGS. 1-2.

In a networked deployment, the computer system may operate in the capacity of an IPTV server, such as a video server or application server, or a set-top box device. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
predicting, at a service provider server, a channel change request based on viewing pattern data associated with a set-top box device, wherein the predicted channel change request indicates a predicted stream of video content to be sent to the set-top box device, and wherein the viewing pattern data includes a day of a week associated with the channel change request and a category of the video content associated with the channel change request;
identifying, at the service provider server, a first network device from a plurality of network devices of an internet protocol television network, wherein the first network device is nearest to the set-top box device and has a first data capacity;
in response to determining that the first data capacity satisfies a threshold, sending, from the service provider server, a first command to the first network device, wherein the first command instructs the first network device to:
generate and store a control signal associated with the predicted channel change request at the first network device;
generate a request to obtain the video content associated with the predicted stream; and
store the video content associated with the predicted stream at the first network device; and
in response to determining that the first data capacity fails to satisfy the threshold:
sending, from the service provider server, a second command to the first network device, wherein the second command instructs the first network device to generate and store the control signal associated with the predicted channel change request at the first network device; and
sending a third command from the service provider server to a second network device, wherein the third command instructs the second network device to generate a request to obtain the video content associated with the predicted stream and to store the video content associated with the predicted stream at the second network device.

2. The method of claim 1, further comprising receiving, at the service provider server, data capacity information of the first network device from the first network device, the data capacity information indicating the first data capacity.

3. The method of claim 1, further comprising:
monitoring channel change request data from the set-top box device for a particular period of time; and
determining the viewing pattern data based on the channel change request data.

4. The method of claim 1, wherein the viewing pattern data further includes a time of the channel change request, a subscriber associated with the channel change request, a trend associated with the channel change request, a first channel viewed before the channel change request, a second channel viewed after the channel change request, or a combination thereof.

5. The method of claim 3, wherein the service provider server is located at a head-end office of a service provider.

6. The method of claim 1, wherein the channel change request is predicted based on data that indicates a request for content from a digital video recorder, the request associated with the set-top box device.

7. The method of claim 1, wherein the first command, the second command, the third command, or a combination thereof is sent prior to matching a received channel change request to the predicted channel change request.

8. A method comprising:
predicting, at a network device of an internet protocol television network, a channel change request based on viewing pattern data associated with a set-top box device, wherein the predicted channel change request indicates a predicted stream of video content to be sent to the set-top box device, and wherein the viewing pattern data includes a day of a week associated with the channel change request and a category of the video content associated with the channel change request;
in response to determining that a particular data capacity of an interface of the network device satisfies a threshold, receiving a first command from a service provider server, wherein the first command instructs the network device to:
generate a control signal at the network device, the control signal related to the predicted channel change request;
store the control signal at a data storage device associated with the network device;
generate a request to obtain video content associated with the predicted stream; and
store the video content associated with the predicted stream at the network device; and
in response to determining that the particular data capacity of the interface of the network device fails to satisfy the threshold, receiving a second command from the service provider server, wherein the second command instructs the network device to generate and store the control signal related to the predicted channel change request at the network device, wherein a third command is transmitted to a second network device, wherein the third command instructs the second network device to generate a request to obtain the video content associated with the predicted stream and to store the video content associated with the predicted stream at the second network device.

9. The method of claim 8, wherein determining whether the particular data capacity satisfies the threshold is performed periodically.

10. The method of claim 8, wherein the particular data capacity fails to satisfy the threshold when the particular data capacity is less than a data capacity that is capable of storing the control signal and the video content.

11. The method of claim 8, wherein the particular data capacity satisfies the threshold when the particular data capacity is greater than a data capacity that is capable of storing the control signal and the video content.

12. The method of claim 8, wherein the network device comprises a digital subscriber line access multiplexer.

13. A system comprising:
a data storage device; and
processing logic and non-transitory memory accessible to the processing logic, the memory including instructions executable by the processing logic to perform operations comprising:
predicting a channel change request based on viewing pattern data associated with a set-top box device, the predicted channel change request indicating a predicted stream of video content to be sent to the set-top box device, wherein the viewing pattern data includes a day of a week associated with the channel change request and a category of the video content associated with the channel change request;
in response to determining that a first data capacity of a first network device satisfies a threshold, sending a first command to the first network device, wherein the first command instructs the first network device to:
generate and store a control signal associated with the predicted channel change request at the first network device;
generate a request to obtain video content associated with the predicted stream; and
store the video content associated with the predicted stream at the first network device; and
in response to determining that the first data capacity fails to satisfy the threshold:
sending a second command to the first network device, wherein the second command instructs the first network device to generate and store the control signal associated with the predicted channel change request at the first network device; and
sending a third command to a second network device, wherein the third command instructs the second network device to generate the request to obtain the video content associated with the predicted stream and to store the video content associated with the predicted stream at the second network device.

14. The system of claim 13, wherein information related to the first data capacity is received from the first network device.

15. The system of claim 13, wherein the viewing pattern data is received from the set-top box device, the first network device, the second network device, or a combination thereof.

16. A network device, comprising:
a network interface;
a data storage device;
processing logic; and
a memory accessible to the processing logic, the memory including instructions executable by the processing logic to perform operations comprising:
determining a first data capacity of the network device;
in response to determining that the first data capacity satisfies a threshold, receiving a first command from a service provider server, wherein the first command instructs the network device to:
generate a control signal associated with a predicted channel change request, wherein the predicted channel change request indicates a predicted stream of video content wherein the predicted channel change request is determined based on viewing pattern data associated with a set-top box device, wherein the viewing pattern data includes a day of a week associated with the predicted channel change request and a category of the video content associated with the predicted channel change request;
store the control signal at the data storage device;
generate a request to obtain video content associated with the predicted stream; and
store the video content at the data storage device; and
in response to determining that the first data capacity fails to satisfy the threshold, receiving a second command from the service provider server, wherein the second command instructs the network device to generate and store the control signal associated with the predicted channel change request at the network device, and transmitting a third command to a second network device, wherein the third command instructs the second network device to generate a request to obtain the video content associated with the predicted stream and to store the video content associated with the predicted stream at the second network device.

17. The network device of claim 16, wherein the operations further comprise determining whether the network device is included in a multicast group related to the predicted channel change request.

18. The network device of claim 17, wherein the operations further comprise making a copy of the video content associated with the predicted stream when the network device is included in the multicast group related to the predicted stream and when the first data capacity satisfies the threshold.

19. The network device of claim 17, wherein the operations further comprise sending a video content request to a service provider server when the network device is not included in the multicast group related to the predicted stream and when the first data capacity satisfies the threshold.

20. The network device of claim 16, wherein the operations further comprise receiving data at the network device that indicates a channel change request associated with the set-top box device, wherein the channel change request indicates a particular stream of video content.

21. The network device of claim 20, wherein the operations further comprise sending the video content related to the predicted stream that is stored at the data storage device to the set-top box device when the channel change request matches the predicted channel change request.

22. The network device of claim 20, wherein the operations further comprise sending a unicast video content request to a service provider server when the channel change request does not match the predicted channel change request, wherein the unicast video content request relates to the particular stream of video content.

23. The network device of claim 16, wherein the first data capacity is related to an amount of available memory at the data storage device, an amount of data capable of being handled via the network interface, or any combination thereof.

24. A computer-readable storage device having instructions that are executable by a processor to cause the processor to perform operations comprising:
  predicting, at a service provider server, a channel change request based on viewing pattern data associated with a set-top box device, wherein the predicted channel change request indicates a predicted stream of video content to be sent to the set-top box device, and wherein the viewing pattern data includes a day of a week associated with the channel change request and a category of the video content;
  identifying, at the service provider server, a first network device from a plurality of network devices of an internet protocol television network, wherein the first network device is nearest to the set-top box device and has a first data capacity to store a control signal associated with the predicted channel change request, the video content associated with the predicted stream;
  in response to determining that the first data capacity satisfies a threshold, sending, from the service provider server, a first command to the first network device, wherein the first command instructs the first network device to:
    generate and store a control signal associated with the predicted channel change request at the first network device;
    generate a request to obtain the video content associated with the predicted stream; and
    store the video content associated with the predicted stream at the first network device; and
  in response to determining that the first data capacity fails to satisfy the threshold:
    sending a second command from the service provider server to the first network device, wherein the second command instructs the first network device to generate and store the control signal associated with the predicted channel change request at the first network device; and
    sending a third command from the service provider server to a second network device, wherein the third command instructs the second network device to generate the request to obtain the video content associated with the predicted stream and to store the video content associated with the predicted stream at the second network device.

25. The computer-readable storage device of claim 24, wherein the control signal relates to joining a multicast group associated with the predicted stream or the control signal relates to leaving a multicast group associated with a stream.

* * * * *